March 28, 1939. A. KNIGHT 2,152,435
ORNAMENT
Filed Jan. 17, 1939 3 Sheets-Sheet 1
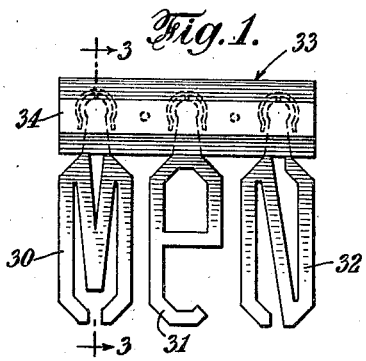
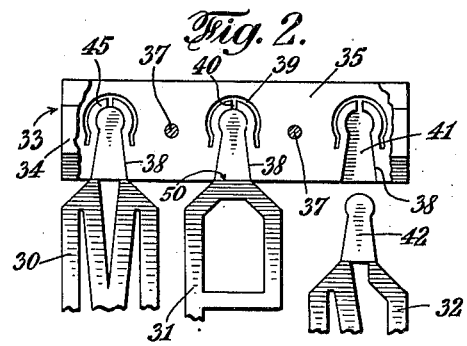
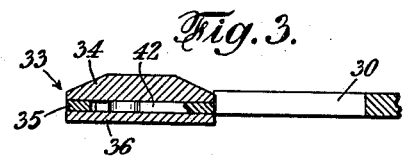
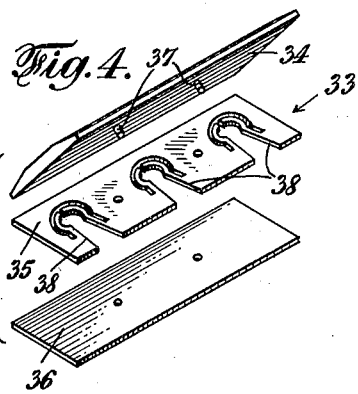
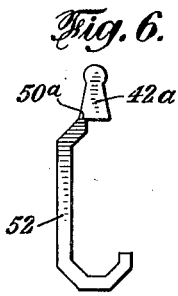
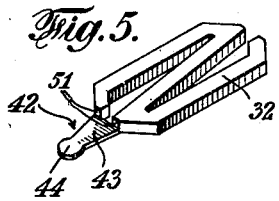
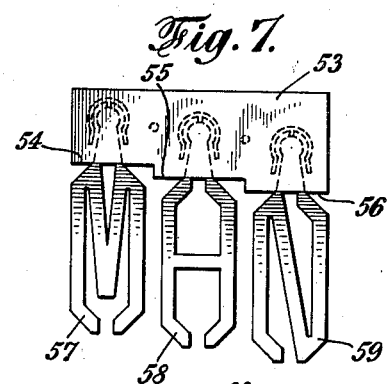
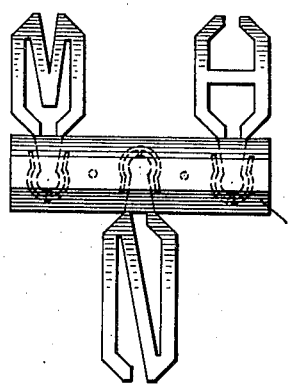
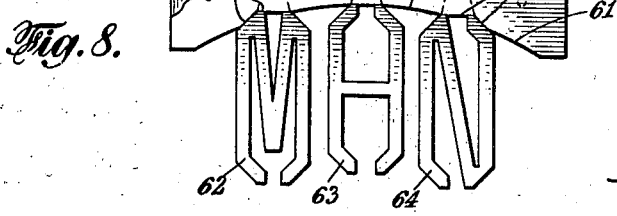
INVENTOR
*Arthur Knight*
BY
*Augustus M. Henry*
his ATTORNEY

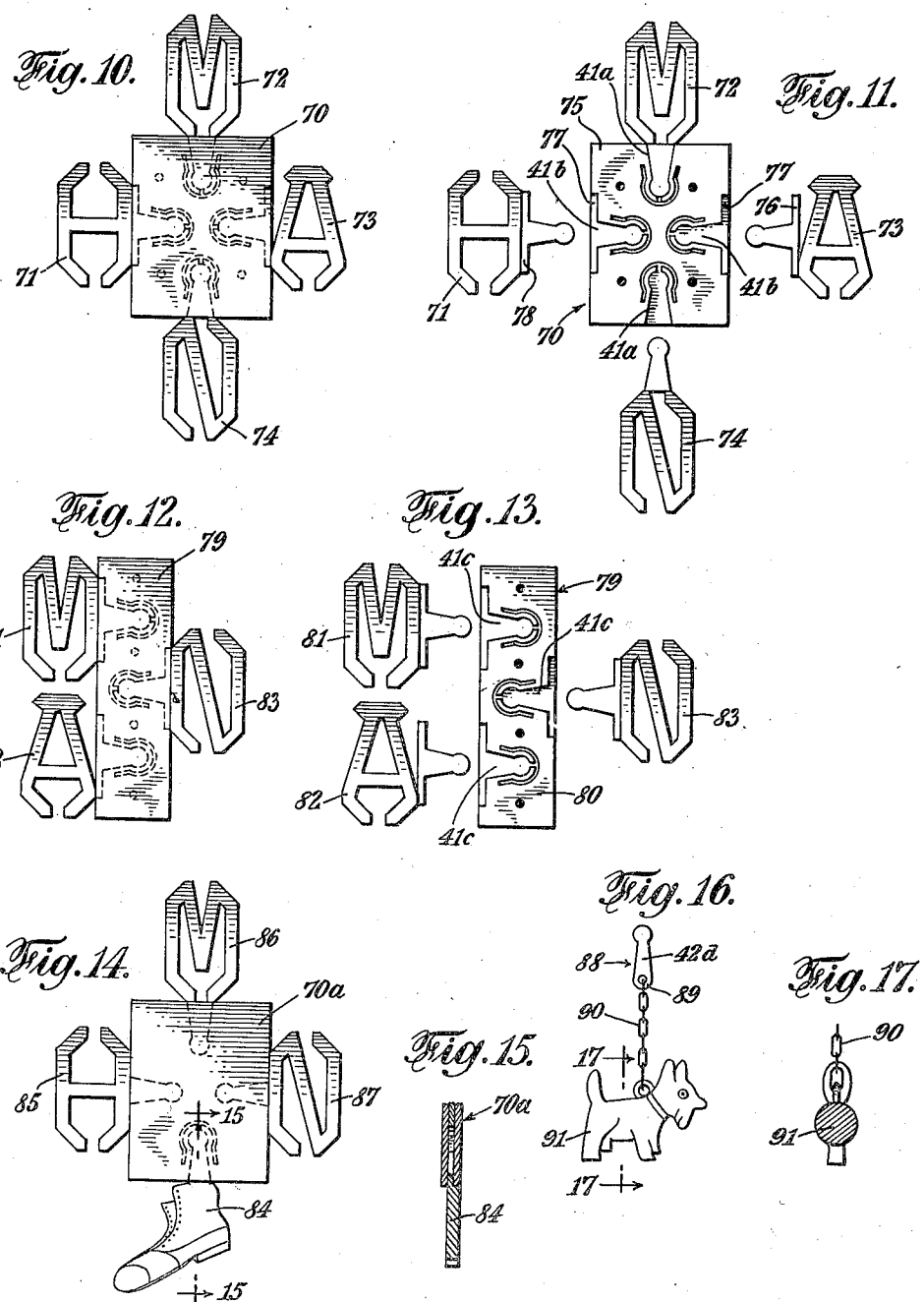

March 28, 1939.  A. KNIGHT  2,152,435
ORNAMENT
Filed Jan. 17, 1939  3 Sheets-Sheet 3
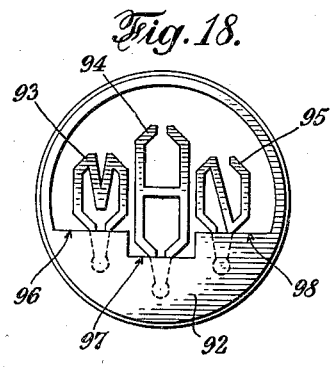
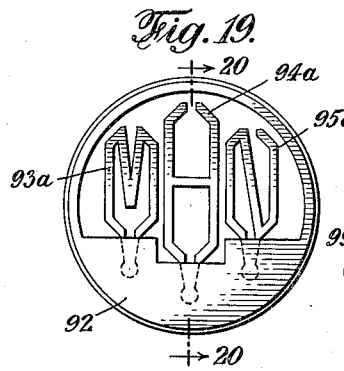
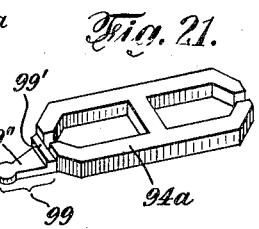
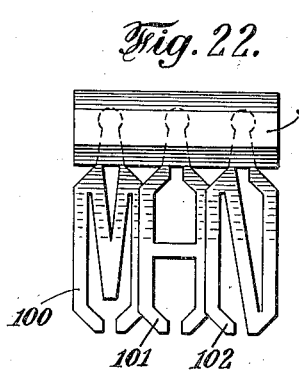
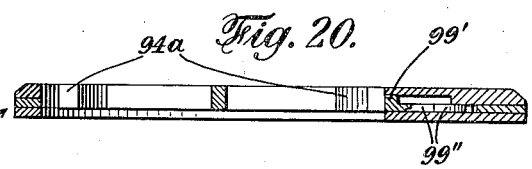
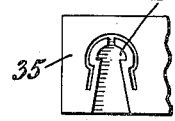
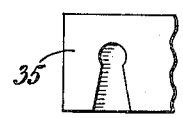
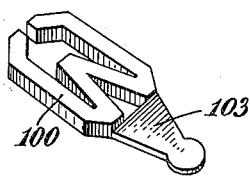
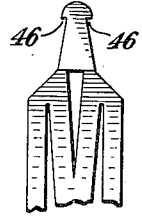
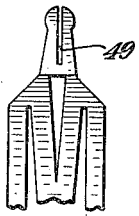
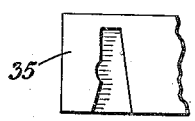
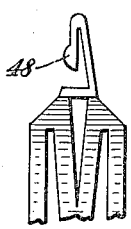
INVENTOR.
Arthur Knight
BY
HIS ATTORNEY.

Patented Mar. 28, 1939

2,152,435

BEST AVAILABLE COPY

UNITED STATES PATENT OFFICE 2,152,435

ORNAMENT

Arthur Knight, Providence, R. I., assignor to Leo K. Stupell, New York, N. Y.

Application January 17, 1939, Serial No. 251,318

9 Claims. (Cl. 40—140)

This invention relates to ornamental assemblages and components; such assemblage of the type including a plurality of separate units, a single mount or carrier for a selected plurality of the units, and means for attaching the desired combination of units to the carrier, securely, and yet without the use of special tools, solder or the like.

These assemblages, examples of which are disclosed in U. S. patents to Stupell Nos. 1,921,437 and 2,024,893, are of utility, both ornamental and otherwise; as for the display of a person's initials, or purely ornamental units, or the identifying indicia of a Greek-letter fraternity, or miscellaneous trinkets, etc. etc.

An object of the present invention is to provide a novel and useful form of carrier, and, for coaction with said carrier, a novel and useful form of unit; regardless of how the carrier is to be attached to any desired support. The method of attachment of the carrier to such support is immaterial to the invention; for instance, it could be equipped with a pin as in a lady's brooch, it could have eyes or hooks for chain or other suspension, it could be provided with prongs for attachment to a piece of luggage, etc. etc.

According to said Stupell patents, the units are mounted on the carrier by making the latter in the form of a frame, and each unit is secured in place on the frame by latch engagement of the unit with two opposite sides of the frame. With this arrangement, a unit, if it is to be held in place, must be gripped at opposite ends. Another proposal has been to provide a carrier in the form of a slotted bar, and to have each unit carry a lug projected from the rear side of the unit and shaped for snap engagement with a slot of the bar. But then the units, instead of being offset from the carrier, overlie the same.

By the present invention, the units are extended beyond the carrier, so as to be wholly offset therefrom, but, at the same time, they are supported on the carrier by connection to the latter only at an end of a unit adjacent to the carrier.

A feature of the invention, to obtain the advantage just referred to, is the provision of a lug on each unit which is preferably in the nature of a blade-like tongue, but which essentially, in the case of a generally plate-like unit or one of greater width and length than thickness, is projected from the unit so as to extend substantially in the direction of face expanse thereof; this tongue to be received in a pocket in the carrier, which pocket has its mouth in an edge portion of the carrier.

The invention, and the above-indicated as well as other of its various features and advantages, will be clearly understood from the following detailed description of certain of the now preferred embodiments of the invention, as these are shown (but merely by way of illustration and not by way of limitation) in the accompanying drawings, in which—

Fig. 1 is a front elevation of one embodiment.

Fig. 2 is a similar view thereof, on an enlarged scale, with parts partially broken away.

Fig. 3 is a section, also on an enlarged scale, taken on the line 3—3 of Fig. 1.

Fig. 4 is an exploded perspective view of said embodiment.

Fig. 5 is a perspective view of one of the units shown in Fig. 1.

Fig. 6 is a front elevation of another type of unit.

Figs. 7, 8, 9 and 10 are views similar to Fig. 1, showing other embodiments.

Fig. 11 is also a front elevation of the embodiment of Fig. 10, but with a top sheet member of the carrier removed, and showing one unit mounted on the carrier and other units about to be thus mounted.

Fig. 12 is a view similar to Fig. 1, showing another embodiment.

Fig. 13 is a view similar to Fig. 11, but showing the embodiment of Fig. 12.

Fig. 14 is a view similar to Fig. 1, showing another embodiment.

Fig. 15 is a section taken on the line 15—15 of Fig. 14.

Fig. 16 is a front elevation of a non-plate-type form of unit according to the invention.

Fig. 17 is a section taken on the line 17—17 of Fig. 16.

Figs. 18 and 19 are views similar to Fig. 1, but showing other embodiments.

Fig. 20 is a section taken on the line 20—20 of Fig. 19, but on an enlarged scale.

Fig. 21 is a view similar to Fig. 5, but showing a unit of special advantage when employed in the embodiments of Figs. 18 and 19.

Fig. 22 is a view similar to Fig. 1, showing another embodiment, and one according to which the units can be arranged overlappingly.

Fig. 23 is a view similar to Fig. 5, but showing a unit of a kind adapted for use in building up the embodiment of Fig. 22.

Fig. 24 is a detail view, showing a modified form of pocket for a carrier.

Fig. 25 is a similar view, showing a modified form of tongue for a unit and one for coaction with the pocket of Fig. 24.

Fig. 26 is a view similar to Fig. 24, showing still another pocket modification.

Fig. 27 is a view similar to Fig. 25, showing a modified form of tongue shaped for coaction with the pocket of Fig. 26.

Fig. 28 is also a view similar to Fig. 4, showing another pocket modification.

Fig. 29 is also a view similar to Fig. 24, showing a modified form of tongue shaped for coaction with the pocket of Fig. 28.

In most of the views, the unit of the present invention is shown as a letter of the alphabet; as this type of unit would probably be employed, regardless of the particular design of letter used, in carrying out the invention in an important field of utility in the art, that is, to provide so-called monograms. The units need not, however, be letters or initials; in emphasis of which other types of units are shown in Figs. 14 and 16.

Referring first to Figs. 1 through 5, an ornamental assemblage according to the invention is shown in which three initials 30, 31 and 32, all of a common font-design now one of those preferred, are mounted on a carrier 33 in the form of a straight horizontal bar. The carrier 33 is shown as made up of three sheet elements, these being a top member 34, an intermediate member 35 and a bottom member 36; all secured tightly permanently together in face contact, as by rivets 37, or in any other suitable way.

The intermediate member 35 has a plurality of main cut-outs 38, extending all the way to an edge of said member; and each of these main cut-outs is here attended as shown by cut-outs in the form of slits 39 and 40.

With the three sheet members secured tightly together, the main cut-outs 38 in the member 35 provide pockets 41 for the reception of appropriately shaped tongues carried by the units.

Such a tongue is marked 42 in the case of the unit 32.

In the preferred form shown, this tongue includes a shank portion marked 43 in Fig. 5 tapered away from the unit, and a rounded enlargement marked 44 in Fig. 5 intermediate the inner and outer ends of the tongue and constituting a terminal head on the free end of the tongue.

The tongues on all units made for interchangeable securement to the carrier are identical, and all the pockets on any carrier for taking these units are also identical. As will be noted, each pocket has an outer portion shaped to fit a tongue shank and an inner portion shaped to fit the rounded head of a tongue.

The units and their tongues can be made of any suitable material, as metal, catalin or the like, ivory, or even a hardwood; and the carrier likewise can be made of any suitable material. But when the carrier is made of sheet members as already described, and the units are to be securely held on the carrier yet so as to be readily deliberately detachable therefrom, as from time to time to change the combination of units on the carrier, and this variability of the device is to be permitted by resilient action of the pockets 41, the intermediate member 35 should be made of resilient material, as spring brass or steel. Then, with the slits 39 and 40 present, a snap-fastener couple is provided as to each unit, one element of which couple is a pocket 41, and the other element of which is the tongue of the unit. The pair of spring strips for each pocket established by the slits 39 and 40, such a strip being marked 45 in Fig. 2, are adapted to be sprung to allow passage of the rounded head of the tongue into and out of the inner end of the pocket.

If it is desired to mount a selected group of units on the carrier, in such manner that by mere endwise insertion of the tongues into the pockets the units will be non-detachably secured to the carrier, one way of insuring this would be to have the rounded heads of the tongues shaped to include straight bases, as indicated at 46 in the case of the tongue shown in Fig. 25, and to shape correspondingly the inner ends of the pockets, as shown at 47 in Fig. 24.

A snap-fastener couple according to the invention can also be provided wherein the tongue is the resiliently acting element. In such case, the slits 39 and 40 could be omitted. One possible type of such tongue, characterized by a U-shaped structure with one leg of the U carrying a projection 48, is illustrated in Fig. 29, and another, characterized by a shape similar to that of the tongue 42 but split centrally by a slit 49, is illustrated in Fig. 27. The pockets in the carrier would, of course, be correspondingly shaped; and with these pockets provided by cut-outs in the intermediate member 35, as shown in Figs. 26 and 28, such member need not be of resilient material. As will be understood, such a tongue as that of Fig. 27 or 29 would be made of a resilient material, with the leg carrying the projection 48 biased away from the other leg of the U of Fig. 29, or with the tongue of Fig. 27 biased toward spread at its central slit 49.

However, it is preferred to provide a snap-fastener couple according to the invention wherein, as in Fig. 2, the pocket in the carrier is the resiliently acting element. Then the tongue of the unit can be very strong yet very thin; and all resilient elements for all the unit mountings can be provided by suitable cut-outs in an intermediate sheet member of a carrier built up from a plurality of sheet members, as in the sheet member 35 of Fig. 4.

Desirably, the carrier has its top sheet member 34 of appreciably greater thickness than either the intermediate or bottom sheet member 35 or 36; and the tongue of a unit is thinner than the unit to provide a shoulder extending laterally of the tongue at the root end thereof. The tongue is preferably of a thickness at least just equal to that of the intermediate sheet member 35, so that when the tongue is fully inserted in a pocket, the tongue is restrained against rocking across its flat. Said shoulder allows a unit to be mounted on the carrier, with the front side of the unit substantially flush with the front of the carrier. Desirably, also, the outer portion of a pocket, as aforesaid shaped to fit the tapered shank of a tongue, is made so as very snugly to fit said shank; to the end that when the tongue is fully inserted in the pocket the tongue will be held against rocking in the plane of its flat. Desirably, further, and also for holding the tongue and consequently the unit against rocking relative to the carrier in the plane of its flat, said shoulder is so located and shaped that with the tongue fully inserted in the pocket the shoulder and an edge portion of the carrier adjacent to the pocket are brought into close line abutment.

The shoulder just mentioned can be a continuous one, or an interrupted one; but in each case easily provided, even where the unit is stamped from sheet metal, as is desirable, particularly where the units are letters of the alphabet or the like. A continuous such shoulder is indicated at 50 in Fig. 2 (on the unit 31, the letter "P"); and an interrupted such shoulder is shown at 51 in Fig. 5, involving a joinder of the tongue 42 and unit 32 such that the tongue is connected to the unit at a plurality of necessarily spaced points (this unit 32 being the letter "N") across the base of the tongue.

Thus, by such an interrupted shoulder, a tongue can be integral with its unit and yet projected therefrom in straddling relation to a cutout in the unit extending all the way to an edge portion of the unit within the limits of the root of the tongue. This structure is of decided utility where the units are letters of the alphabet or the like, some of which are "open" at what may be desired to be a tongue location, as, for instance, at "H", which is open at its top and bottom, or a "C", which is open at a side, and so on. As will be understood from a mere inspection of the various views, including those not yet described in detail, a desired tongue location, in carrying out the invention in one way or another, could be anywhere around a unit, as at one side or the other thereof or at the top or bottom thereof.

Also according to the invention the tongue can be integral with its unit yet projected largely in offset relation from an edge portion of the unit.

Fig. 6 shows such a structure, in which is illustrated a unit incorporating at 52 the letter "L", and having its tongue 42 in offset relation to the upper end of said letter and stepped down therefrom at a short shoulder 50a.

Referring to Fig. 7, a carrier 53 is shown, of the same multi-sheet construction as the carrier 33 of Fig. 1, so shaped as to have the mouths of the pockets at edge portions of the carrier, yet at edge portions 54, 55 and 56 which are stepped one relative to another. With these pockets shaped as indicated like the pockets 41, and with units 57, 58 and 59 carrying at their tops tongues like the tongue 42, an assemblage is provided in which the units are also in stepped relation. Such units can be of different heights, but they are here shown as of the same height, so that their bottoms are also in stepped relation.

In Fig. 8, a carrier 60 is illustrated, of the same multi-sheet construction as previously described, which has a face expanse bounded by a curved edge 61 into which the mouths of the pockets open; this edge in the present case being shown as the lower edge of the carrier, with the carrier shaped substantially like a section of an annulus. Nevertheless, the units, even if initials or otherwise characterized by general lines of extension which should be parallelly arranged for best visual effect, can be mounted on this carrier so as to have parallel projection therefrom, and still, on the one hand, without displaying any parts of their tongues, and, on the other hand, with any one of the units mountable by inserting its tongue in any one of the pockets of the carrier. One way in which these advantages according to the invention can be obtained is shown. Here three units 62, 63 and 64 are illustrated. These units, it will be noted, are initials so shaped that they are of substantially identical outline at the portions thereof (their tops, in the present case) from which their tongues are extended, with said outline including a top horizontal edge portion when an initial is closed at its top. The pockets of the carrier 60, three of which are here provided, and the tongues of the units 62, 63 and 64, can be, as shown, exactly like the pockets and tongues of Fig. 1. But the top sheet member 65 of the carrier 60 has two cut-outs 66 and 67 shaped to conform to the upper outlines of the units, and the cut-outs which form the two end pockets in the intermediate member 68 of the carrier 60 are located so that the mouths of these pockets are horizontally aligned with the horizontal edge portions of the cut-outs 66 and 67. The units 62, 63 and 64 are shown as of the same height, but one desirable combination would be to have the middle unit of greater height than the other two.

In the form of the invention shown in Figs. 1, 2 and 8, the pockets are placed in the carrier so that the units will depend from the carrier; but these pockets, as will be understood, could be otherwise placed on the carrier, even arranged with all their mouths at the upper edge portions of the carrier, so that all the units could be mounted on the carrier to stand upright thereon.

In Fig. 9 is illustrated an arrangement where the units are so arranged that among them is a unit with a depending tongue at its bottom and also a unit with an upstanding tongue at its top. A carrier 69, of the same multi-sheet construction as previously described, is shown as in the form of a horizontal bar. Here the pockets are arranged on the carrier as indicated, so that with the units mounted on the carrier one is dependent below the carrier and the other two are upstanding above the same.

Referring to the embodiments of Figs. 10 and 11, and of Figs. 12 and 13, these show carriers, both of the same multi-sheet construction as previously described, adapted to have units mounted thereon so as to extend horizontally from vertical edge portions of the carrier.

In Figs. 10 and 11, a carrier 70 is shown which is approximately square in shape. This carrier has four pockets, one extended inward from each of the four straight bounding edges of the carrier. As will have been noted from the units already described, and as will be noted in the case of the units 71, 72, 73 and 74 here, even though said unit 73 is the letter "A", the units are preferably so shaped that they are all of substantially identical outline at their bottoms as well as at their tops. Therefore, two of the pockets in the intermediate sheet member 75 of the carrier 70, those marked 41a in Fig. 11, can be exactly like a pocket 41 of Fig. 2, and the units to be mounted by aid of these pockets can have their tongues shouldered relative to the main body of the unit as explained in connection with the embodiment of Fig. 1.

However, an "open" point at a side of a letter may vary heightwise of the letter in different letters, and may be, as in the case of the letter "S", for instance, quite removed from a midway point along the height of a letter. One satisfactory way to meet situations of this kind has already been described in connection with Fig. 6. Another way, and one preferred in the case of such a letter as an "A" when formed like that constituting the unit 73, is to interpose, between the root end of the tongue and the thicker main body of the unit, a strip-like portion as thin as the tongue, and made long enough heightwise of the letter to be connected to a closed part of the letter at a part of the latter of maximum width. Such a strip-like portion for the unit 73 is shown at 76. So as to hide such strip-like portion when the unit carrying the same has its tongue fully inserted in the pocket selected to mount the unit as intended on the carrier, such pocket, as shown in the case of the two pockets 41b of Fig. 11, would have its mouth suitably stepped back from the edge portion of the unit against which the unit is to be abutted according to the invention, and the intermediate sheet member 75 would be additionally cut out to establish a vestibular pocket 77 for said strip-like portion. Desirably, as in Fig. 11, such vestibular pocket would be provided for each main pocket the mouth of which is in a vertical edge of the carrier, and each unit having a sidewisely extended tongue would have a tongue addition to fit in and fill such vestibular pocket; so that any type of unit could be mounted on the carrier at a selected one of a plurality of pocket locations. Such a tongue-addition is shown at 78 on the unit 71; which element 78, it will be noted, is like the strip-like portion 76 on the unit 73.

In Figs. 12 and 13, a carrier 79 is shown which is of the bar type as in Figs. 1 and 9, but with the bar vertical. This carrier has three pockets, one extended inward from one vertical edge of the carrier and the other two extended inward from the other vertical edge thereof. It will be noted that all these pockets, marked 41c, are like the pockets 41b of Fig. 11, spaced back from the edge portions of the carrier toward which their mouths face, and the cut-outs in the intermediate sheet member 80 of the carrier are made so as to establish vestibular pockets similar to the vestibular pockets 77 of Fig. 11. And all the units to be mounted by way of these pockets are equipped, as shown in the case of the three units 81, 82 and 83 illustrated, with tongues and strip-like tongue-additions as described in connection with the units 71 and 73 of Fig. 11. The units 81, 82 and 83 are shown as of the same height, but in some cases it may be found advantageous to have the unit 83 or a substitute therefor of greater height, or greater height and width, than the other two units.

The units for any carrier need not, as already stated, be letters of the alphabet. They can be of any significatory, decorative or other appearance; and, indeed, may in any manner have characteristics representative of a caprice of the moment or reflective of any fashion trend in jewelry or otherwise current at the time.

In Figs. 14 and 15, for example, a unit 84 is shown which is a plate cut and chased or otherwise inscribed to represent a shoe; such unit for being mounted at any location, as by the same tongue and pocket couple employed as described for other units, on any carrier according to the invention. In Fig. 14 such carrier is shown as a carrier 79a exactly like the carrier 79 of Fig. 10; and said carrier is illustrated as used for mounting, in addition to the unit 84, a plurality of units which are initials, these latter marked 85, 86 and 87.

Again, any unit for attachment to a carrier according to the invention could be merely a securing means for a trinket of any kind.

One example of such a means is illustrated in Figs. 16 and 17, where a unit 88 is shown which comprises an eye-extension 89 from a tongue 41d, such eye say for suspending, as by a chain 90, a charm or other trinket of non-plate-like type, the latter shown as a dog 91.

In Fig. 18, a carrier 92, of the same multi-sheet construction as previously described, is shown as in the form of a frame, in the present case a circular frame; and three units 93, 94 and 95 are shown as carried by and within this frame. While the units are framed, they are, according to the invention, connected to one side only of the frame, instead of to two opposite sides of the frame as in the aforesaid Stupell patents. In other words, there are clearly seen spacings between one side of the frame and the ends of the units opposite to the ends thereof connected to the opposite side of the frame. Such an assemblage has the advantage, especially where it provides what is called in the art a monogram because the units within the frame are initials, of presenting an appearance to carry the suggestion that it is a custom-made monogram or one cut by hand from a single sheet of metal. In the type of frame selected for illustration in Fig. 18, the pockets carried thereby according to the invention are in the bottom interior of the frame; the lower ends of the units 93, 94 and 95 are defined by horizontal lines of considerable length; and these unit ends are abutted flatly against horizontal edge portions 96, 97 and 98 at different levels in the lower part of the frame. In this embodiment, the pocket mouths are in the edge portions 96, 97 and 98, such pockets extend as indicated in broken lines, and the tongues on the units extend downward from the unit bottoms.

Referring to Figs. 19, 20 and 21, the same frame 92 as in Fig. 18 is shown, and also units 93a, 94a and 95a, which units are precisely similar to the units 93, 94 and 95 of Fig. 18 except as regards tongue construction. The units 93a, 94a and 95a all have a modified tongue construction like that shown in Figs. 20 and 21. Thereby the advantage is obtained that the units can be mounted on the carrier 92 according to the invention, and yet excessive or unsightly spacing between the upper interior of the frame and the tops of the units can be avoided. Each of the units 93a, 94a and 95a, as shown in the case of the unit 94a, has a tongue 99 which over a portion 99' of its length adjacent to its root, is of a thickness to fit snugly in a carrier pocket so far as the dimension of said pocket depthwise of the frame is concerned, but this tongue over a portion 99'' of its length adjacent to its outer end is of less thickness. This arrangement permits the tongue to be sent part way into the pocket, while the unit is canted relative to the plane of the frame to an extent to allow the upper end of the unit to overlap the top of the frame, and until the upper end of the unit can be dropped within the frame. Such preliminary insertion of the tongue in the pocket having been completed, the unit can be further advanced, but now while uniplanar with the frame, to insert the tongue fully in the pocket. Thereby, the final spacing between the top interior of the frame and the top of the unit will be less than the full length of the tongue, that is, equal only to the length of the portion 99' of the tongue.

Referring finally to Figs. 22 and 23, an arrangement is illustrated whereby the tongue and pocket couple of the invention can be employed, and yet, with the units initials, the units can be mounted on a carrier so that one unit will partially overlap another, to obtain a "monogram"-effect favored. Three of such overlapped units, marked 100, 101, and 102, are shown as mounted on a carrier 33a exactly like the carrier 33 of Fig. 1. To accomplish such overlap, it is merely necessary to provide the tongues on the units so that the flats of the units are inclined slightly relative to the flats of the units, and to such extent that, when the tongues are sent into their pockets, with these latter in the same plane on the carrier but in somewhat closer spacing one from another than usual, the units will all be slightly parallelly inclined relative to the flat of the carrier while one unit partially overlaps another. Such a tongue, for the unit 100, is shown at 103 in Fig. 23.

While in every case illustrated in the drawings, a carrier is shown with three or four pockets and for having three or four units mounted thereon, it should be understood that any carrier could be provided with any number of pockets, for having mounted thereon a corresponding number of units.

It will be noted that in all embodiments of the invention, as is clear from those illustrated and described, a tongue according to the invention can be provided on any unit, whether an initial or otherwise, so that by way of such tongue the unit can be mounted on a carrier of any shape and at any edge portion thereof, yet in a way to have the tongue always invisible when the assemblage is ordinarily viewed.

Variations and modifications, additional to those hereinabove described in exemplification of the invention, are within the same; and parts of the improvements can be used without others. The scope of protection contemplated is to be taken solely from the appended claims, interpreted as broadly as in consistent with the prior art.

I claim:

1. An article of the kind described, comprising a plurality of separate units of greater width and length than thickness; a single carrier for a plurality of the units, said carrier also of greater width and length than thickness and being of curved extension along an edge thereof; and means for interchangeably mounting different units on the carrier, there being one such means for each unit, each of said means including coacting elements one on the carrier and another on a unit, said element on the carrier being a pocket having its mouth in said edge of the carrier and extended into the carrier in the direction of face expanse thereof, and said element on a unit being a tongue extended from the unit in substantially the direction of face expanse thereof, said tongue shaped for insertion in said pocket; the several pocket mouths being spaced along said curved edge, each of said units having a substantially straight shoulder defining the line of junction between the unit and its tongue, and said carrier being cut away above and adjacent to a pocket mouth to provide a recess for taking a part of a shoulder of a unit when the tongue of that unit is fully inserted in said pocket.

2. A unit having a greater width and length than thickness and having a tongue whereby the unit can be mounted on a suitable carrier by insertion of said tongue in an accommodating recess in the carrier, said tongue being extended from the unit substantially in the general direction of face expanse thereof but being laterally inclined relative to the flat of the unit.

3. A carrier for a plurality of selectively interchangeable units, said carrier being provided with recesses having mouths in edge portions of the carrier for receiving tongues projected from said units; said carrier including a top member, an intermediate member and a bottom member secured together; said intermediate member being a sheet element and said top and bottom members having flat sides for clamping between them the opposite sides of said sheet element, and said recesses being established by cut-out portions of said sheet element.

4. A carrier as in claim 3, in which said sheet element is of resilient material, and there are slits in said sheet element adjacent to said cut-outs to establish resilient walls for said recesses.

5. A carrier as in claim 3, in which said sheet element is of resilient material, there are slits in said sheet element adjacent to said cut-outs to establish resilient walls for said recesses, said walls being shaped to include lateral enlargements of said recesses intermediate the inner and outer ends of the latter.

6. A carrier for a plurality of selectively interchangeable units, said carrier being provided with pockets having mouths in edge portions of the carrier for receiving tongues projected from said units; said carrier including a plurality of separate sheet members arranged in face to face relation and secured together to extend all over the expanse of said carrier provided with said pockets, said pockets being in part established by voids in one of said sheet members and in part established by voids in one of said sheet members and in part established by an immediately adjoining sheet member where the latter crosses said voids.

7. A carrier for a plurality of selectively interengageable units, said carrier being provided with pockets having mouths in edge portions of the carrier for receiving blade-like tongues projected from and substantially in the plane of said units; said carrier including a plurality of separate sheet members arranged in face to face relation and secured together in said relation, one of said sheet members having recesses therein to establish parts only of said pockets, other parts of said pockets being provided by portions of a sheet member other than the one having said recesses.

8. An article of the kind described, comprising a plurality of separate units of greater width and length than thickness; a single carrier for a plurality of the units, said carrier also of greater width and length than thickness and being of curved extension along an edge thereof; and means for interchangeably mounting different units on the carrier, there being one such means for each unit, each of said means including coacting elements one on the carrier and another on a unit, said element on the carrier being a pocket having its mouth in said edge of the carrier and extended into the carrier in the direction of face expanse thereof, and said element on a unit being a tongue extended from the unit in substantially the direction of face expanse thereof, said tongue shaped for insertion in said pocket; the several pocket mouths being spaced along said curved edge; each of said units being enlarged laterally of its tongue, and the carrier being cut away above and adjacent to a pocket mouth to provide a recess for displaying such enlarged portion of a unit when the tongue of that unit is fully inserted in said pocket.

9. An article of the kind described, comprising a carrier in the form of a rigid substantially uniplanar frame surrounding an opening; a plurality of substantially uniplanar units; means for mounting said units in said opening with their flats substantially parallel with the flat of the frame, each unit at one end, as a part of said means, having a tongue projected therefrom, the complementary element for the unit last-mentioned being a pocket in the frame having a mouth facing said opening; and means for obviating the necessity of flexing the frame or a unit when mounting the latter by way of the means first-mentioned, while permitting the end of the unit opposite to its tongue-carrying end to be finally spaced a less distance from the adjacent portion of the frame than the length of its tongue, the means last-mentioned comprising a shaping of said tongue such that the same has a portion thereof adjacent to its free end which is thinner than a portion thereof adjacent to its root end.

ARTHUR KNIGHT.

CERTIFICATE OF CORRECTION.

Patent No. 2,152,435.  March 28, 1939.

ARTHUR KNIGHT.

It is hereby certified that error appears in the printed specification of the above numbered patent requiring correction as follows: Page 5, second column, lines 23 and 24, claim 6, strike out the words "and in part established by voids in one of said sheet members"; and that the said Letters Patent should be read with this correction therein that the same may conform to the record of the case in the Patent Office.

Signed and sealed this 16th day of May, A. D. 1939.

Henry Van Arsdale
Acting Commissioner of Patents.

(Seal)